(12) United States Patent
Hirano et al.

(10) Patent No.: US 8,958,173 B1
(45) Date of Patent: *Feb. 17, 2015

(54) HARD DISK DRIVE HAVING MULTIPLE MOVABLE DISK STACKS ON A GUIDE RAIL

(71) Applicant: HGST Netherlands B.V., Amsterdam (NL)

(72) Inventors: Toshiki Hirano, San Jose, CA (US); Tatsuo Nakamoto, Sagamihara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/056,893

(22) Filed: Oct. 17, 2013

(51) Int. Cl.
G11B 33/14 (2006.01)

(52) U.S. Cl.
USPC ...................................................... 360/98.01

(58) Field of Classification Search
None
See application file for complete search history.

(56) References Cited

U.S. PATENT DOCUMENTS

| | | | |
|---|---|---|---|
| 3,864,747 A | 2/1975 | Pejcha | |
| 4,019,205 A | 4/1977 | Salmond et al. | |
| 4,566,087 A | 1/1986 | Kraft | |
| 5,343,345 A | 8/1994 | Gilovich | |
| 5,415,471 A | 5/1995 | Dalziel | |
| 5,449,091 A | 9/1995 | Dalziel | |
| 5,777,957 A | 7/1998 | Lyman | |
| 6,005,831 A | 12/1999 | Park | |
| 6,115,215 A | 9/2000 | Adams et al. | |
| 6,208,489 B1 | 3/2001 | Marchon | |
| 6,449,130 B1 | 9/2002 | Koyama | |
| 6,628,469 B1 | 9/2003 | Hoyt | |
| 7,475,409 B2 | 1/2009 | Yamagami et al. | |
| 7,596,060 B2 | 9/2009 | Li | |
| 7,760,463 B2 | 7/2010 | Ward et al. | |
| 8,028,311 B2 | 9/2011 | Gilovich | |
| 8,112,580 B2 | 2/2012 | Bandic et al. | |
| 2006/0044663 A1 | 3/2006 | Stiles et al. | |
| 2009/0067086 A1 | 3/2009 | Kaneko et al. | |
| 2011/0122528 A1 | 5/2011 | Burness | |

FOREIGN PATENT DOCUMENTS

| | | |
|---|---|---|
| EP | 0671741 A2 | 9/1995 |
| EP | 0895237 A1 | 2/1999 |

OTHER PUBLICATIONS

Andrew, Kane, "Unusual Disk Optimization Techniques", University of Waterloo, Oct. 28, 2009, 33 pp., URL: https://cs.uwaterloo.ca/~arkane/Presentation%20-%20Unusual%20Disk%20Optimization%0Techniques.pdf.
Seiichi Sugaya, "Trends in Enterprise Hard Disk Drives", FUJITSU Sci. Tech. J., Jan. 2006, pp. 61-71, vol. 42, Issue 1.
"Toshiba rises above competition with world's lightest notebook PC'", downloaded from: https://www.toshiba.eu/innovation/jsp/news.do?service=EU&year=NONE&ID=PORTEGE_R500_NEWS_RELEASE_0 607 on May 28, 2014.

*Primary Examiner* — Mark Blouin
(74) *Attorney, Agent, or Firm* — John D. Henkhaus

(57) ABSTRACT

A lower cost per unit of storage hard disk drive (HDD) includes multiple disk stacks movably coupled to a guide rail and a head stack assembly (HSA) for accessing the magnetic-recording disks of each of the multiple disk stacks. A disk stack feeding mechanism may be implemented to move each of the disk stacks along the guide rail, and a positioning mechanism may be implemented to align and to temporarily fix a disk stack relative to an HSA. An internal filtering system may also be implemented for keeping contamination-free a compartment in which the disk stacks and HSA are operational.

20 Claims, 4 Drawing Sheets

US 8,958,173 B1

HARD DISK DRIVE HAVING MULTIPLE MOVABLE DISK STACKS ON A GUIDE RAIL

FIELD OF THE INVENTION

Embodiments of the invention relate generally to hard disk drive (HDD) storage devices and more particularly to lowering the cost per unit of storage capacity.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

While increasing areal density, a measure of the quantity of information bits that can be stored on a given area of disk surface, is one of the ever-present holy grails of HDD design evolution, the cost per unit of storage is also an ever-present constraint associated with HDD development. The cost per storage capacity, or price per capacity from a consumer's standpoint, is especially important in large data storage scenarios, such as with archival and backup storage in which large amounts of data are stored but infrequently accessed.

SUMMARY OF EMBODIMENTS OF THE INVENTION

Embodiments are directed to a hard disk drive (HDD) having multiple disk stacks movably coupled to a guide rail and one or more head stack assembly (HSA) for accessing portions of one or more magnetic-recording disk of each of the multiple disk stacks. Thus, a lower cost HDD design is described which can be manufactured to have a lower cost per unit of storage.

Embodiments may include a disk stack feeding mechanism which moves each of the disk stacks along the guide rail, and may include a positioning mechanism configured to align and to temporarily fix a disk stack relative to an HSA. Embodiment may also include an internal filtering system for keeping a filtered compartment, where the disk stacks and HSA are operational, contamination-free.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Described herein are approaches to a hard disk drive (HDD) having multiple disk stack assemblies movable along a guide rail and which are serviced by one or more head stack assembly (HSA) after being moved to a fixed position relative to an HSA. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
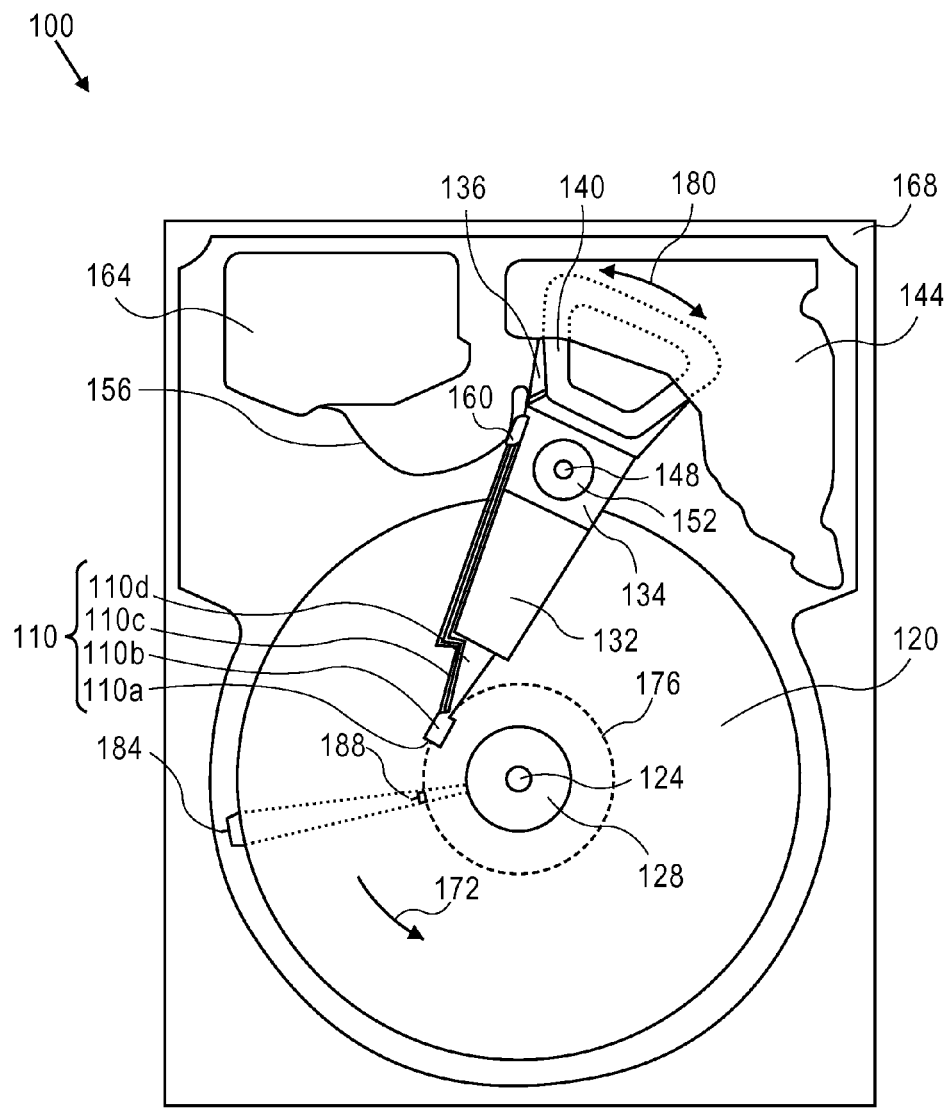
FIG. 1 is a plan view illustrating a conventional hard disk drive (HDD)

Embodiments of the invention relate to a hard-disk drive (HDD). In accordance with an embodiment of the invention, a plan view illustrating a conventional HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not shown) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components (not visible), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks (not shown) arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

The cost per unit of storage, or price per storage capacity from a consumer's standpoint, is especially important in large data storage scenarios (also referred to as "Big Data"), such as with archival and backup storage in which large amounts of data are stored but infrequently accessed (also referred to as "cold storage"). Some example approaches to lowering the cost per unit of storage are to use larger diameter disks, more disks per disk stack, and the "elevator drive" with a head stack assembly moving vertically to service a large stack of disks.

Multiple Movable Disk-Stacks Coupled to a Guide Rail

One approach to lowering the cost per unit of storage is to increase the share of the total cost that the media represents, effectively amortizing cost contributors such as the read/write heads, electronics, and the like, over more media capacity and thus more overall storage capacity.

Figure 2:
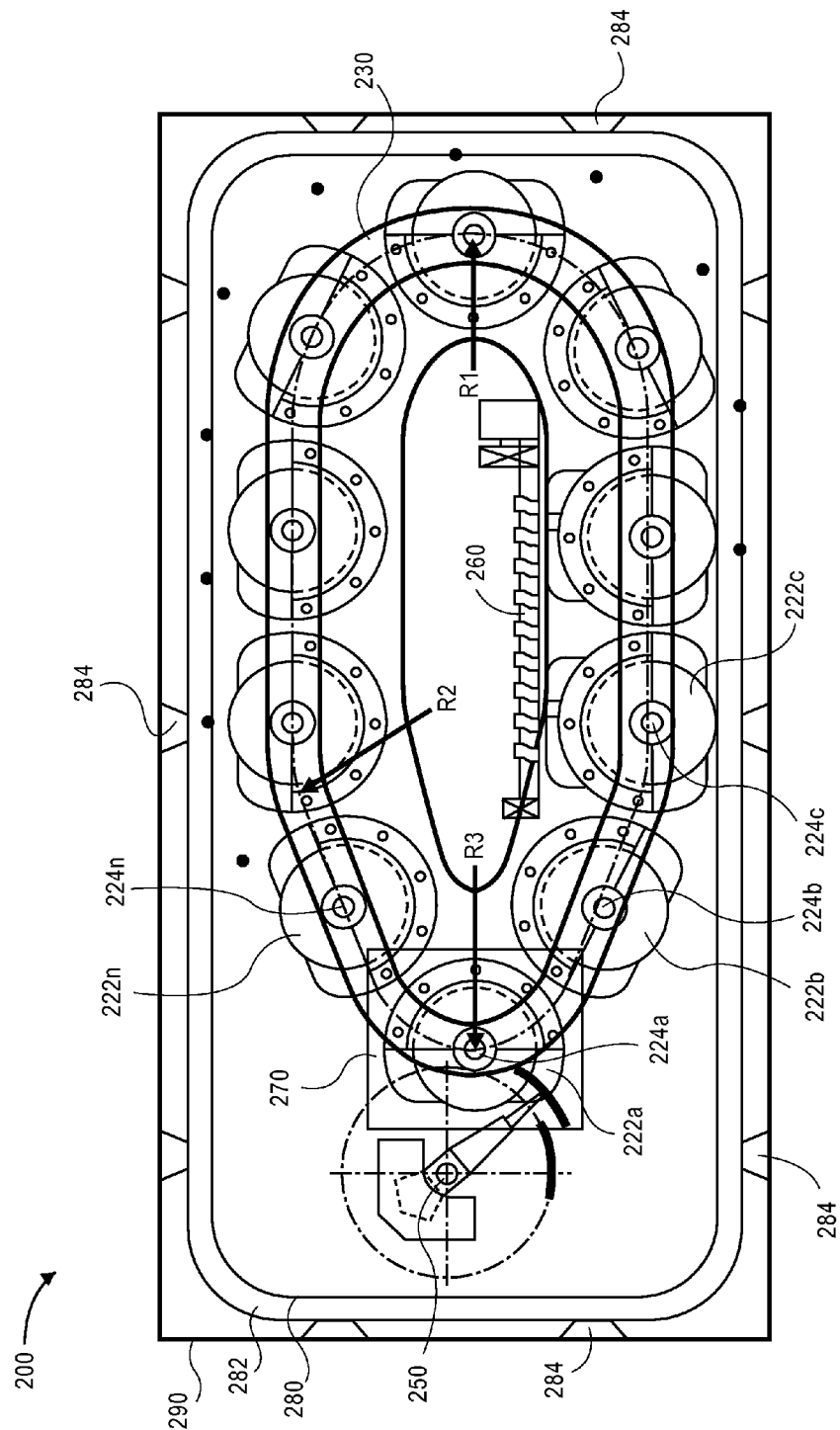
FIG. 2 is a plan view illustrating a multiple disk stack HDD, according to an embodiment of the invention.

FIG. 2 is a plan view illustrating a multiple disk stack HDD, according to an embodiment of the invention. With the exception of components and/or assemblies discussed hereafter, the internal components of HDD 200 are largely similar to or the same as like components of HDD 100 (FIG. 1). Thus, for the purposes of clarity and simplicity, such like components are not necessarily depicted in FIG. 2 or described again in reference to FIG. 2. Reference is made to FIG. 1 and the corresponding description for the showing and description of the components of HDD 200 that are like components of HDD 100.

One difference between HDD 200 and HDD 100 (FIG. 1) is that HDD 200 comprises multiple disk stacks, i.e., disk stacks 222a, 222b, 222c-222n (referred to hereafter collectively as 222a-222n), where n equals a total number of disk stacks which may vary from implementation to implementation, rather than the typical single disk stack. Each disk stack 222a-222n comprises one or more disk 220. Preferably but not by way of limitation, each disk stack 222a-222n would comprise multiple disks, such as ten disks 220 per disk stack 222a-222n, to provide for a large storage capacity HDD. The one or more disk 220 of each disk stack 222a-222n is coupled to and rotated by a respective spindle, i.e., spindle 224a-224n.

Each disk stack 222a-222n is movably coupled to a guide rail 230. HDD 200 further comprises one or more head stack assembly (HSA) 250 to service the disks 220 of disk stacks 222a-222n, and a disk stack feeding mechanism 260. Feeding mechanism 260 is configured to move each disk stack 222a-222n along the guide rail 230 to a fixed position relative to the HSA 250. Although a single HSA 250 is depicted in FIG. 2 for purposes of simplicity and clarity, HDD 200 may be configured with more than one HSA 250 at one or more respective position adjacent to and around the perimeter of guide rail 230. HSA 250 comprises similar components as shown and described in reference to FIG. 1, such as armature 136, voice coil 140 or another type of rotational actuating device, pivot-shaft 148, pivot-bearing assembly 152, carriage 134, arm 132, head gimbal assembly (HGA) 110, arm-electronics (AE) module 160, and flexible interconnect cable 156.

According to an embodiment, feeding mechanism 260 is configured to move the disk stacks 222a-222n along the guide rail 230 in both clockwise and counter-clockwise directions. The particular design (e.g., mechanical, electrical, electromechanical, etc.) for the feeding mechanism 260, utilized to move the disk stacks 222a-222n along the guide rail 230, may vary from implementation to implementation. For non-limiting examples, one could implement a ball screw mechanism, a linear actuator, a chain and sprocket, and the like, where a suitable feeding mechanism may be selected by one skilled in the relevant art based, for example, on the presence of particular design constraints and/or goals.

With continued reference to FIG. 2, HDD 200 comprises a positioning mechanism 270 located at a disk servicing stage, whereby the positioning mechanism 270 is configured to align and to temporarily fix a disk stack 222a-222n relative to an HSA 250. A particular system or apparatus design (e.g., mechanical, electrical, electro-mechanical, optical, etc.) for the positioning mechanism 270, utilized to precisely position, align and temporarily fix each disk stack 222a-222n relative to HSA 250 may vary from implementation to implementation. For non-limiting examples, one could implement a slot and pin mechanism, a position sensor system, and the like, where a suitable positioning and fixing mechanism may be selected by one skilled in the relevant art based, for example, on the presence of particular design constraints and/or goals.

Figure 4:
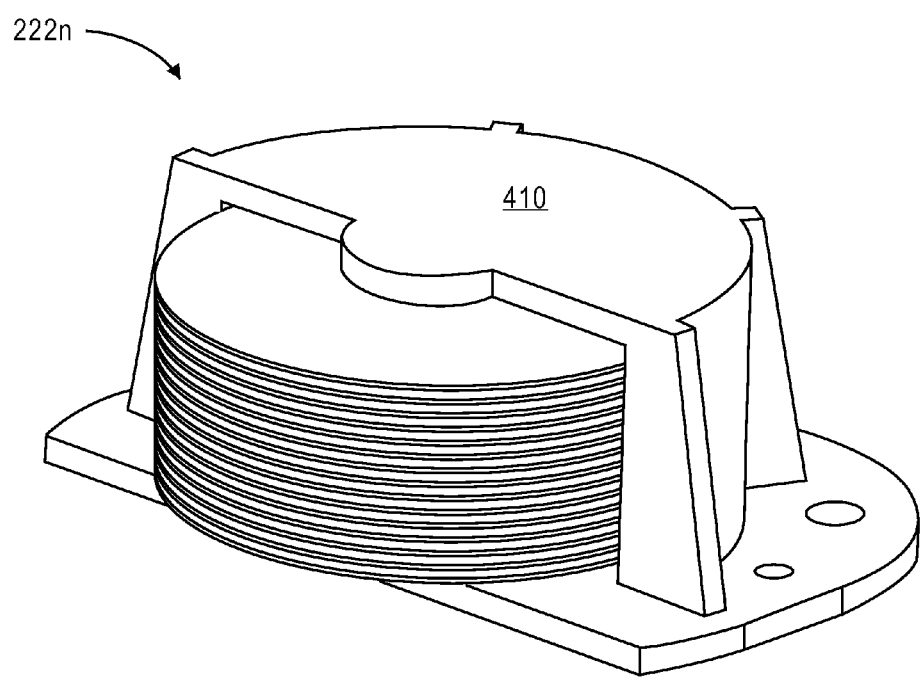
FIG. 4 is a perspective view illustrating a movable disk stack assembly, according to an embodiment of the invention.

FIG. 4 is a perspective view illustrating a movable disk stack assembly, according to an embodiment of the invention. With this embodiment, each disk stack (e.g., disk stacks 222a-222n of FIG. 2) is partially encased by a shroud 410, whereby a shaft associated with each spindle 224a-224n (FIG. 2) is fixed at each end to a respective shroud 410. Shroud 410 provides for management of the air/gas flow occurring in and around the disk stack during read/write operations, e.g., to manage flow-induced vibration associated with the HSA 250 caused by turbulent air incident on the HSA 250. Additionally, shroud 410 provides for aligning and securing each disk stack 222a-222n relative to the HSA 250 for HDD operational purposes.

Returning reference to FIG. 2, according to an embodiment, guide rail 230 is configured having a shape with two or more different radii, such as R1, R2 and R3 as depicted in FIG. 2. Such a multi-radii guide rail 230 provides design freedom regarding, for example, space for the HSA 250 and the positioning mechanism 270.

Each HSA 250 is configured to move a respective one or more head slider to access portions of a magnetic-recording disk 220 of the disk stacks 222a-222n. In a single-HSA 250 embodiment, each disk stack 222a-222n is accessed asynchronously, i.e., one disk stack 222a-222n at a time, after the respective disk stack is moved by the feeding mechanism 260 along guide rail 230 to a fixed position relative to the HSA 250. In a multi-HSA 250 embodiment, each of multiple disk stacks 222a-222n may be accessed simultaneously by a respective HSA 250 after the respective disk stacks are moved by the feeding mechanism 260 along guide rail 230 to respective fixed positions relative to each respective HSA 250.

With further reference to FIG. 2, according to an embodiment, HDD 200 includes an inner enclosure 280, which encloses the multiple disk stacks 222a-222n, the guide rail 230, and the HSA 250. With this embodiment, the inner enclosure 280 is encased within an outer enclosure 290, with a recirculation channel 282 therebetween, for recirculating the gas within HDD 200. According to an embodiment, multiple shock mounts 284 are positioned between the inner enclosure 280 and the outer enclosure 290, around the perimeter of the inner enclosure 280 and recirculation channel 282. The purpose of the shock mounts 284 is to isolate the inner enclosure 280 and its constituent operational components from vibration, shock, etc. that may be sustained by the outer enclosure 290.

Figure 3:
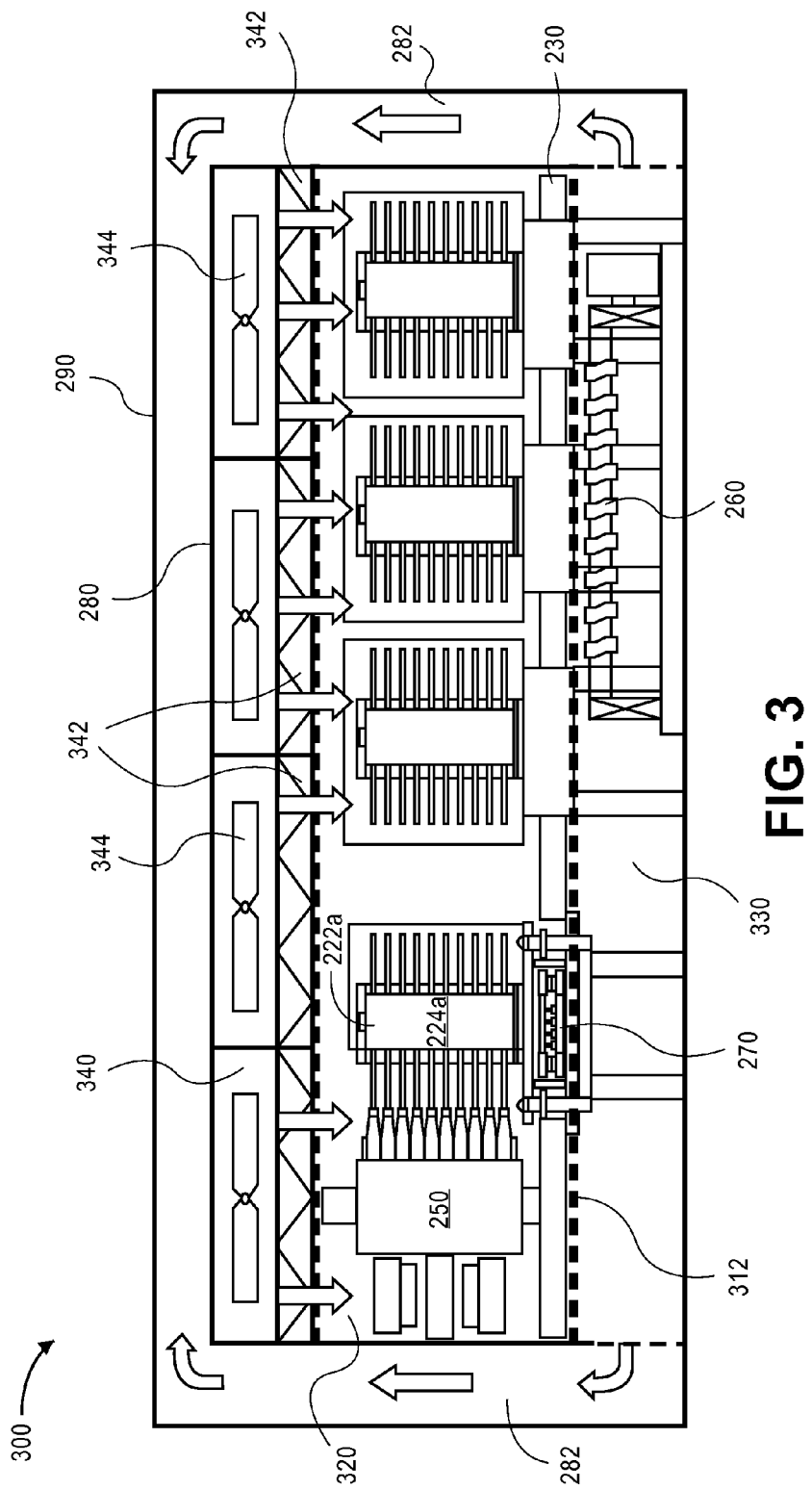
FIG. 3 is a side view illustrating a multiple disk stack HDD, according to an embodiment of the invention.

FIG. 3 is a side view illustrating a multiple disk stack HDD, according to an embodiment of the invention. The side view of HDD 300 illustrates multiple disk stacks, such as disk stacks 222a-222n (for clarity, not all visible), coupled to guide rail 230 and movable by the disk stack feeding mechanism 260 to engage with the positioning mechanism 270 located at the disk servicing stage, where the actuator of HSA 250 is configured to move one or more head sliders to access portions of one or more magnetic-recording disk of a respective disk stack 222a-222n.

Filtering System

With further reference to FIG. 3, HDD 300 includes the inner enclosure 280, which encloses the multiple disk stacks 222a-222n, the guide rail 230, and the HSA 250. According to an embodiment, included within enclosure 280 is a base floor 312, which separates a filtered compartment 320 above the base floor 312 and a dirty compartment 330 below the base floor 312. The components that are more prone to generate particles during operation, such as the disk stack feeding mechanism 260 and the disk stack positioning mechanism 270 are positioned at least in part, or largely, in the dirty compartment 330 beneath the base floor 312.

According to an embodiment, HDD 300 further comprises one or more filter 342 positioned in a filtering compartment 340 above the filtered compartment 320, and one or more fan 344 positioned in the filtering compartment 340 and above the filter(s) 342, where the fan(s) 344 is configured to generate air (or other gas) flow through the filter(s) 342 and into the filtered compartment 320. Thus, particulate matter that may be generated during operation of HDD 300 is kept out of the filtered compartment 320. As mentioned, and according to an embodiment, the inner enclosure 280 is encased within the outer enclosure 290, with the recirculation channel 282 therebetween, for recirculating the gas within HDD 300 to the filtering compartment 340, as depicted by the block arrows in FIG. 3.

A configuration such as the foregoing creates a "clean room" type air/gas filtering system, in an attempt to keep the filtered compartment 320 contamination-free.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive, comprising:
a plurality of disk stacks, each disk stack comprising one or more magnetic-recording disk rotatably mounted on a spindle;
a guide rail on which said plurality of disk stacks are movably coupled; and
a head stack assembly, comprising:
a head slider comprising a magnetic read/write head for reading data from and writing data to one or more magnetic-recording disk,
a flexure, to which said head slider is coupled,
an actuator arm, to which said flexure is coupled, and
an actuator, to which said actuator arm is coupled, said actuator configured to move said head slider to access portions of said one or more magnetic-recording disk of each of the plurality of disk stacks.

2. The hard disk drive of claim 1, wherein said head stack assembly comprises a single actuator configured to move said head slider to access said portions of said one or more magnetic-recording disk, and wherein each of the plurality of disk stacks is positioned for asynchronous access.

3. The hard disk drive of claim 1, comprising:
a disk stack feeding mechanism configured to move each of said plurality of disk stacks along said guide rail;
wherein each of the plurality of disk stacks is positioned for asynchronous access after said disk stack is moved along said guide rail by said feeding mechanism to a fixed position relative to said head stack assembly.

4. The hard disk drive of claim 3, wherein said feeding mechanism is configured to move said disk stacks along said guide rail in both clockwise and counter-clockwise directions.

5. The hard disk drive of claim 1, comprising:
a disk stack feeding mechanism configured to move each of said plurality of disk stacks along said guide rail; and
a positioning mechanism located at a disk servicing stage, said positioning mechanism configured to align and to temporarily fix a disk stack relative to said head stack assembly;
wherein each of the plurality of disk stacks is positioned for asynchronous access after said disk stack is moved along said guide rail by said feeding mechanism and temporarily fixed at said disk servicing stage.

6. The hard disk drive of claim 1, consisting of a single head stack assembly.

7. The hard disk drive of claim 1, comprising a plurality of head stack assemblies.

8. The hard disk drive of claim 7, wherein each of said plurality of head stack assemblies is configured to move a respective head slider to access said portions of said one or more magnetic-recording disk, and wherein a plurality of disk stacks are positioned for simultaneous access by said plurality of head stack assemblies.

9. The hard disk drive of claim 1, comprising:
an enclosure configured to enclose said plurality of disk stacks, said guide rail, and said head stack assembly; and
wherein said enclosure comprises a base floor separating a filtered compartment above said base floor and a dirty compartment below said base floor.

10. The hard disk drive of claim 9, comprising:
one or more filter positioned in a filtering compartment above said filtered compartment; and
one or more fans positioned in said filtering compartment above said one or more filter and configured to flow gas through said one or more filter into said filtered compartment.

11. The hard disk drive of claim 10, comprising:
a recirculation channel configured for recirculating gas within said enclosure to said filtering compartment.

12. The hard disk drive of claim 9, comprising:
a disk stack feeding mechanism positioned largely in said dirty compartment and configured to move each of said plurality of disk stacks along said guide rail.

13. The hard disk drive of claim 9, comprising:
a positioning mechanism positioned largely in said dirty compartment and configured to align and to temporarily fix a disk stack relative to said head stack assembly.

14. The hard disk drive of claim 9, wherein said enclosure is an inner enclosure, said hard disk drive comprising:
an outer enclosure in which said inner enclosure is encased;
a plurality of shock mounts positioned between said inner enclosure and said outer enclosure.

15. The hard disk drive of claim 1, comprising:
a shroud partially encasing each of said plurality of disk stacks; and
wherein said spindle of each disk stack is fixed at both ends to a respective shroud.

16. The hard disk drive of claim 1, wherein said guide rail is shaped having two or more different radii.

17. A hard disk drive, comprising:
a plurality of disk stacks, each disk stack comprising one or more magnetic-recording disk rotatably mounted on a spindle;
a guide rail on which said plurality of disk stacks are movably coupled;
a head stack assembly, comprising:
a head slider comprising a magnetic read/write head for reading data from and writing data to one or more magnetic-recording disk,
a flexure, to which said head slider is coupled,
an actuator arm, to which said flexure is coupled, and
an actuator, to which said actuator arm is coupled, said actuator configured to move said head slider to access portions of said one or more magnetic-recording disk of each of the plurality of disk stacks;
a disk stack feeding mechanism configured to move each of said plurality of disk stacks along said guide rail; and
a positioning mechanism located at a disk servicing stage, said positioning mechanism configured to align and to temporarily fix a disk stack relative to said head stack assembly.

18. A hard disk drive, comprising:
a plurality of disk stacks, each disk stack comprising one or more magnetic-recording disk rotatably mounted on a spindle;
a guide rail on which said plurality of disk stacks are movably coupled;
a head stack assembly, comprising:
a head slider comprising a magnetic read/write head for reading data from and writing data to one or more magnetic-recording disk,
a flexure, to which said head slider is coupled,
an actuator arm, to which said flexure is coupled, and
an actuator, to which said actuator arm is coupled, said actuator configured to move said head slider to access portions of said one or more magnetic-recording disk of each of the plurality of disk stacks;
a disk stack feeding mechanism configured to move each of said plurality of disk stacks along said guide rail;
a positioning mechanism located at a disk servicing stage, said positioning mechanism configured to align and to temporarily fix a disk stack relative to said head stack assembly;
an inner enclosure configured to enclose said plurality of disk stacks, said guide rail, and said head stack assembly, said inner enclosure comprising:
a base floor separating a filtered compartment above said base floor and a dirty compartment below said base floor;
an outer enclosure in which said inner enclosure is encased;
one or more filter positioned in a filtering compartment above said filtered compartment;
one or more fans positioned in said filtering compartment above said one or more filter and configured to flow gas through said one or more filter into said filtered compartment; and a recirculation channel configured for recirculating gas within said outer enclosure to said filtering compartment.

19. The hard disk drive of claim 18,
wherein said disk stack feeding mechanism and said positioning mechanism are positioned largely in said dirty compartment.

20. The hard disk drive of claim 18, comprising:
a plurality of shock mounts positioned between said inner enclosure and said outer enclosure.

\* \* \* \* \*